United States Patent
Bland

(10) Patent No.: US 7,805,922 B2
(45) Date of Patent: Oct. 5, 2010

(54) FUEL FLOW TUNING FOR A STAGE OF A GAS TURBINE ENGINE

(75) Inventor: Robert J. Bland, Oviedo, FL (US)

(73) Assignee: Siemens Energy, Inc., Orlando, FL (US)

( * ) Notice: Subject to any disclaimer, the term of this patent is extended or adjusted under 35 U.S.C. 154(b) by 1043 days.

(21) Appl. No.: 11/350,561

(22) Filed: Feb. 9, 2006

(65) Prior Publication Data

US 2007/0180831 A1 Aug. 9, 2007

(51) Int. Cl.
*F02C 9/00* (2006.01)

(52) U.S. Cl. ................... 60/39.281; 60/773

(58) Field of Classification Search ............ 60/773, 60/39.281, 746, 747
See application file for complete search history.

(56) References Cited

U.S. PATENT DOCUMENTS

| | | | |
|---|---|---|---|
| 5,319,931 A | 6/1994 | Beebe et al. | |
| 5,661,969 A | 9/1997 | Beebe et al. | |
| 6,082,111 A | 7/2000 | Stokes | |
| 6,209,310 B1 * | 4/2001 | Kuenzi et al. | 60/775 |
| 6,370,863 B2 * | 4/2002 | Muller et al. | 60/776 |
| 6,425,239 B2 | 7/2002 | Hoffmann et al. | |
| 6,655,152 B2 * | 12/2003 | Griffiths et al. | 60/773 |
| 6,691,518 B2 | 2/2004 | Doebbeling et al. | |
| 6,772,583 B2 | 8/2004 | Bland | |
| 6,877,307 B2 | 4/2005 | Ryan et al. | |
| 2002/0178730 A1 * | 12/2002 | Ganz et al. | 60/773 |
| 2004/0025512 A1 * | 2/2004 | Davis et al. | 60/773 |
| 2004/0045273 A1 | 3/2004 | Bland et al. | |
| 2004/0255594 A1 * | 12/2004 | Baino et al. | 60/773 |
| 2005/0198964 A1 * | 9/2005 | Myers et al. | 60/739 |
| 2007/0089424 A1 * | 4/2007 | Venkataramani et al. | 60/773 |
| 2007/0157624 A1 * | 7/2007 | Bland et al. | 60/776 |

\* cited by examiner

*Primary Examiner*—Michael Cuff
*Assistant Examiner*—Phutthiwat Wongwian

(57) ABSTRACT

A method and system for controlling combustion in a gas turbine engine (10) includes reducing an overall fuel flow provided to a stage (22) of burners (e.g. 34, 35) of the gas turbine engine until reaching a predetermined dynamic operating condition of the first burner of the stage. The method also includes maintaining, while continuing to reduce the overall fuel flow (e.g. 30), a first portion (e.g. 36), of the overall fuel flow delivered to the first burner at a maintenance level so that the predetermined dynamic operating condition of the first burner is maintained.

17 Claims, 1 Drawing Sheet

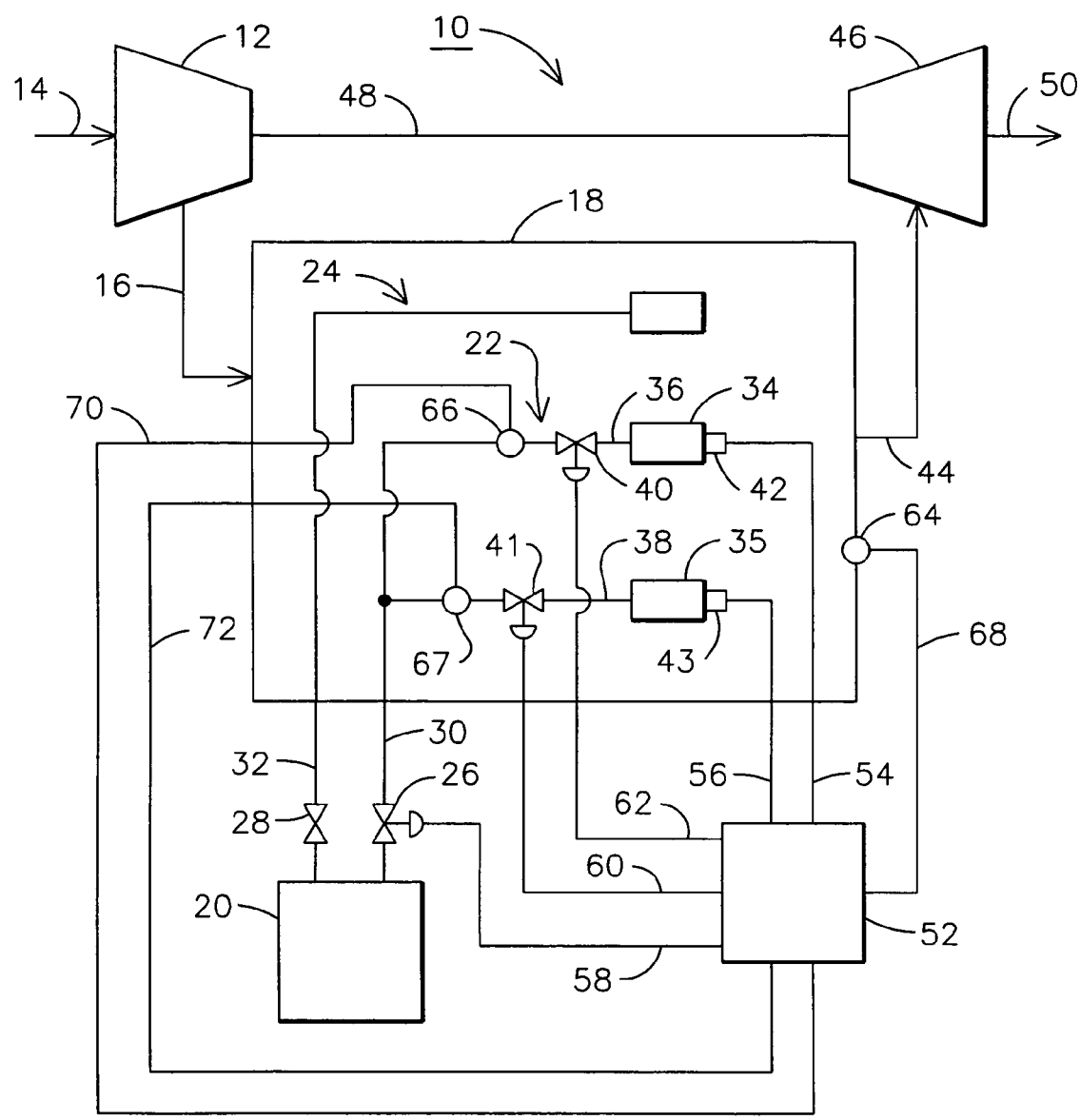

FUEL FLOW TUNING FOR A STAGE OF A GAS TURBINE ENGINE

FIELD OF THE INVENTION

The present invention relates generally to gas turbines, and, more particularly, to reducing an overall fuel flow to a stage of a gas turbine engine to achieve a desired lowered pollutant emission while maintaining dynamic stability of each of the burners of the stage.

BACKGROUND OF THE INVENTION

Gas turbine engines are known to include a compressor for compressing air, a combustor for producing a hot gas by burning fuel in the presence of the compressed air produced by the compressor, and a turbine for expanding the hot gas to extract shaft power. Gas turbine engines using annular combustion systems typically include a plurality of individual burners disposed in a ring about an axial centerline for providing a mixture of fuel and air to an annular combustion chamber disposed upstream of the annular turbine inlet vanes. Other gas turbines use can-annular combustors wherein individual burner cans feed hot combustion gas into respective individual portions of the arc of the turbine inlet vanes. Each can includes a plurality of main burners disposed in a ring around a central pilot burner, as illustrated in U.S. Pat. No. 6,082,111.

The design of a gas turbine combustor is complicated by the necessity for the gas turbine engine to operate reliably with a low level of emissions, such as oxides of nitrogen (NOx), at a variety of power levels. In addition, it is important to ensure the stability of the flame to avoid unexpected flame-out and damaging levels of acoustic vibration. A relatively rich fuel/air mixture will improve the stability of the combustion process but will have an adverse affect on the level of emissions. A careful balance must be achieved among these various constraints in order to provide a reliable machine capable of satisfying very strict modern emissions regulations over a wide range of loading conditions. A pilot flame is commonly used to stabilize the flame.

Staging is the delivery of fuel to burners of the gas turbine engine through at least two separately controllable fuel supply systems or stages. Staging is known as a method to control combustion in a gas turbine combustor. A staged gas turbine combustor pilot is described in U.S. Pat. No. 6,877,307 as having a premix stage wherein air and fuel are premixed prior to being combusted in a pilot combustion region to achieve reduced pollutant emission. In a multi-stage gas turbine engine, the fuel stages are typically operated according to preset fuel flow values, or fuel fractions of the total fuel provided to the engine, corresponding to values in a fuel flow table that specifies fuel amounts delivered to the respective stages. The values stored in fuel flow table may correspond to certain load ranges and environmental operating conditions, such as ambient temperature and/or humidity.

Traditionally, gas turbine engine settings, such as fuel flow settings, for a land-based powder generation turbine are manually "tuned" by a combustion engineer during the start-up of the power plant in order to satisfy appropriate emissions criteria without exceeding dynamic operating condition limitations.

BRIEF DESCRIPTION OF THE DRAWINGS

The invention is explained in the following description in view of the sole FIGURE that shows a functional diagram of an exemplary embodiment of a gas turbine system configured for performing an improved combustion tuning method.

DETAILED DESCRIPTION OF THE INVENTION

As emission limits become increasingly stringent, low NOx combustors must be operated increasingly close to their dynamic limits. According, control of combustion dynamics has become more critical than in the past. While staging has been used to reduce NOx emission, dynamic operation may be worsened as NOx production is decreased. In can annular gas turbine engine, control of dynamics is made even more difficult because dynamic characteristics may vary widely from can to can. For example, it has been observed that dynamic variation among cans in a can annular combustor may vary by a factor of three between the noisiest and quietest can. The reasons for such variation are not always known, are not easily characterized, and may not be resolvable by improved manufacturing or assembly techniques. The inventors have recognized that improved dynamic control for burners having different dynamic operating characteristics may be achieved by sequentially tailoring a fuel flow to each burner of a stage responsive to a dynamic operating condition of the burner while reducing an overall flow to the stage to minimize both NOx and dynamics for each of the burners.

In addition to the problem of different burners having different dynamic operation characteristics, one stage of a gas turbine engine may be exhibit a sharp or more rapid dynamic response in the presence of changing fuel flows than another stage. For, example, in a two stage pilot having a diffusion stage and a premix stage, it has been observed that a 0.2% to 0.3% change in an amount of a fuel fraction provided to the premix stage may cause the premix stage to exhibit an intermediate frequency dynamic instability while the diffusion stage dynamics remain relatively insensitive to such changes. Accordingly, it is important to ensure that stages having faster dynamic response characteristics than other stages be carefully controlled. Further, a first stage having a plurality of burners may have a dynamic response characteristic that is more sensitive to an amount of a fuel flow than a dynamic response characteristic of the second stage.

The Figure shows a gas turbine engine 10 including a compressor 12 for receiving ambient air 14 and for providing compressed air 16 to a combustor 18. The combustor 18 also receives combustible fuel, for example, from a fuel supply 20. The fuel supply 20 may supply fuel to one or more stages of the combustor 18, such as a first stage 22 and a second stage 24, through respective fuel supply valves 26, 28. The fuel supply valves 26, 28 may regulate an overall fuel flow 30, 32 supplied to each stage 22, 24. At least one of the stages, such as the first stage 22, may include two or more burners 34, 35 being fed respective fuel flow portions 36, 38 of the overall fuel flow 30 through respective burner valves 40, 41. In an aspect of the invention, the burner valves 40, 41 are configured to operate separately from each other and the fuel supply valve 26 to independently provide respective burner fuel flow portions 36, 38 to each of the burners 34, 35. In an embodiment of the invention, the first stage 22 may be a premix stage of pilot burners in respective cans of a can annular combustor.

Dynamic condition sensors 42, 43 disposed proximate the burners 34, 35 sense respective dynamic operating conditions of the burners 34, 35. Flow sensors may be used to sense respective fuel flow portions 36, 38 provided to the burners 34, 35. For example, the fuel flow portions 36, 38 may be monitored by pressure sensors 66, 67 disposed, for example, upstream of the valves 40, 41 and by a pressure sensor 64 disposed downstream of the burners 34, 35. Pressure readings provided by the pressure sensors 64, 66, 67 to the controller may be processed to determine differential pressures between respective pressure sensors 66, 67 and pressure sensor 64 to calculate respective fuel flow values, such as mass flows of the portions 36, 38.

Combustion of the overall fuel flows 30, 32 supplied to the combustor 18 in the compressed air 16 results in the supply of hot combustion gas 44 to turbine 46, wherein the hot combustion gas 44 is expanded to recover energy in the form of the rotation of shaft 48 that is used, in turn, to drive the compressor 12. The turbine exhaust 50 is delivered back to the ambient atmosphere.

The gas turbine engine 10 is provided with a controller 52 for implementing steps necessary for controlling the flow of fuel to the combustor 18, such as the overall fuel flow 30 and burner fuel flow portions 36, 38 to the first stage 22 to achieve desired operating conditions of the combustor 18. Controller 52 may take any form known in the art, for example an analog or digital microprocessor or computer, and it may be integrated into or combined with one or more controllers used for other functions related to the operation of the gas turbine engine 10. The steps necessary for such processes may be embodied in hardware, software and/or firmware in any form that is accessible and executable by controller 52 and may be stored on any medium that is convenient for the particular application.

In an aspect of the invention, the controller 52 receives input signals 54, 56 from the dynamic condition sensors 42, 43 and input signals 68, 70, 72 from pressure sensors 66, 67, such as may be part of a continuous dynamic monitoring system provided as part of the gas turbine engine 10. In one embodiment, dynamic condition sensors 42, 43 may include a pressure sensor, an acoustic sensor, an electromagnetic energy sensor, or other type of sensor known in the art for sensing dynamic parameter fluctuations responsive to fluctuations in the combustion process. The controller 52 may have outputs 58, 60, 62 for controlling the position of respective valves 26, 41, 40 to control the overall fuel 30 delivered to the first stage 22 and the portions 36, 38 provided to the respective burners 34, 35 of the first stage 22.

The controller 52 may be configured for controlling combustion in the combustor 18 of the gas turbine engine 10 to optimize fuel splits among the burners 34, 35 of the stage 22 to maintain respective dynamic operating conditions of the burners 34, 35. A method for controlling combustion in the gas turbine combustor 18 may include reducing an overall fuel flow provided to a stage of the combustor 18 while sequentially reaching respective predetermined dynamic operating conditions of each of the burners of the stage. The method also includes maintaining, while continuing to reduce the overall fuel flow, respective burner fuel flows delivered to the burners at a maintenance level of flow so that predetermined dynamic operating conditions of each burner are maintained. In an embodiment, the method includes reducing the overall fuel flow 30 until a first burner, e.g. 34, of the fuel stage 22 reaches a predetermined dynamic operating condition, such as predetermined degree of dynamic instability. For example, data from the dynamic condition sensor 42 associated with the first burner 42 may be monitored by the controller 52 to determine when a dynamic frequency spike having an amplitude exceeding a certain limit is detected. Once the first burner 34 has been identified as exhibiting the predetermined dynamic operating condition, the fuel flow portion 36, such as the mass flow of the portion, to the first burner 34 may be maintained at a maintained level of flow sufficient to achieve the desired predetermined dynamic operating condition during subsequent tuning operations, such as tuning operations sequentially performed on other burners, e.g. 35, of the stage 22. In an aspect of the invention, the fuel flow portion 36 of the overall fuel flow 30 may be increased from a flow level corresponding to the predetermined dynamic operating condition to provide a desired operating margin away from the predetermined dynamic operating condition to further ensure stable operation of the burner 34. For example, in a can annular type of combustor, the fuel flow portion 36 provided to the to the first burner 34 may be increased by about 0.5% of a total fuel flow provided to the can associated with the burner 34. As the overall fuel flow 30 is decreased during tuning of other burners of the stage, a corresponding reduction in the amount of the fuel flow portion 36 to the first burner 34 may result. Consequently, the valve 40 may need to be gradually opened to compensate for the overall reduced flow to maintain the same mass flow to the burner 34.

After identifying and setting the fuel flow portion 36 of the first burner 34, the overall fuel flow 30 is further reduced until a second burner, e.g. 35, of the stage 22 is identified as reaching its predetermined dynamic operating condition. The second portion 38 of the overall fuel flow 30 provided to the second burner 35 is then maintained so that the predetermined dynamic operating condition of the second burner 35 is maintained while continuing to reduce the overall fuel flow 30. This process of reducing the overall fuel flow 30 until a burner is detected as reaching a desired dynamic condition is repeated for each burner of the stage 22 until all burners fuel flows portions have been set to achieve their respective predetermined dynamic operating conditions. Accordingly, the overall flow 30 may be minimized to reduce NOx formation, while each burner is independently operating at its respective dynamic limit to insure stability of each burner. After all fuel flow portions to the respective burners have been tuned, the position of the respective valves controlling the fuel flow portions may be set since no further reduction of the overall flow 30 is necessary. Once a first stage, such as a pilot premix stage of a gas turbine engine, is tuned to operate according to the above method, other stages, such as a pilot diffusion stage having a dynamic characteristic that is slower, or less steep, than the first stage, may then be tuned with less concern regarding affecting dynamic stability of the first stage.

In an aspect of the invention, the above method may be performed when the gas turbine engine 10 is being operated in a load range of about 40% to 100% of a base load rating of the gas turbine engine 10. In another aspect, the method may be performed responsive to a change in an operating environment of the gas turbine engine, and/or responsive to a change in a load on the gas turbine engine.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

What is claimed is:

1. A method for controlling combustion in a gas turbine engine comprising:
monitoring dynamic operating conditions for each of the burners in a stage with a plurality of burners of a gas turbine using a dynamic condition sensor;
reducing an overall fuel flow provided to the stage of burners of the gas turbine engine until reaching a predetermined dynamic operating condition of a first burner of the stage using a controller to control a stage fuel flow valve, the predetermined operating condition exhibiting a predetermined degree of dynamic instability; and maintaining a first mass flow rate of fuel delivered to the first burner at a maintenance level using the controller, a first burner flow sensor, and a first burner flow valve, so that the predetermined dynamic operating condition of the first burner is maintained while continuing to reduce the overall fuel flow to the stage via the stage fuel flow valve.

2. The method of claim 1, comprising:
further reducing the overall fuel flow via the stage fuel flow valve until reaching a predetermined dynamic operating condition of a second burner of the stage; and
maintaining a second mass flow rate of fuel delivered to the second burner using the controller, a second burner flow sensor, and a second burner flow valve, so that the predetermined dynamic operating condition of the second burner is maintained while continuing to reduce the overall fuel flow.

3. The method of claim 1, further comprising, when the predetermined dynamic operating condition of the first burner is reached, increasing the first mass flow rate to provide a desired operating margin away from the predetermined dynamic operating condition using the controller and at least one of the stage fuel flow valve and the first burner flow valve.

4. The method of claim 1, wherein the method is implemented only when the gas turbine engine is being operated in a load range of about 40% to 100% of a base load rating of the gas turbine engine.

5. The method of claim 1, further comprising performing the steps of claim 1 responsive to a change in an operating environment of the gas turbine engine.

6. The method of claim 1, further comprising performing the steps of claim 1 responsive to a change in a load on the gas turbine engine.

7. The method of claim 1, further comprising monitoring the dynamic operating condition of the first burner to determine when the first burner reaches its predetermined dynamic operating condition using the controller and a first burner dynamic condition sensor.

8. The method of claim 1, further comprising monitoring the first mass flow rate using the controller and flow sensor to identify when the first mass flow rate is not being maintained at the maintenance level.

9. The method of claim 8, further comprising correcting a first mass flow rate being identified as not being maintained to the maintenance level using the controller and at least one of the stage fuel flow valve and the first burner flow valve.

10. In a gas turbine combustor comprising at least two stages, a first stage having a plurality of burners and having a dynamic response characteristic being more sensitive to an amount of a fuel flow than a dynamic response characteristic of a second stage, a method for controlling combustion in the combustor comprising:

monitoring dynamic operating conditions for each of the burners in the first stage of burners of a gas turbine using a dynamic condition sensor;
reducing an overall fuel flow provided to the first stage while sequentially reaching respective predetermined dynamic operating conditions of each of the burners of the first stage using a controller to control a stage flow valve, wherein respective predetermined operating conditions exhibit a predetermined degree of dynamic instability; and
maintaining respective burner fuel mass flow rates delivered to the respective burners at respective maintenance levels once the respective predetermined operating condition of the respective burner is reached so that the predetermined dynamic operating conditions of each burner is maintained using respective burner flow sensors and respective burner flow valves, while continuing to reduce the overall fuel flow using the controller and stage flow valve.

11. The method of claim 10, wherein monitoring dynamic operating conditions of burners further comprises monitoring the dynamic operating conditions of each of the burners using a burner dynamic condition sensor for each burner to determine when each burner reaches its predetermined dynamic operating condition.

12. The method of claim 10, further comprising monitoring the respective burner fuel flow rates to identify when a burner fuel flow rate is not being maintained at the maintenance level using the controller and respective burner flow sensor.

13. The method of claim 12, further comprising correcting a burner fuel flow rate being identified as not being maintained to return the burner fuel flow rate to the maintenance level using the controller, the respective burner flow sensor, and at least one of the stage fuel flow valve and the respective burner flow valve.

14. The method of claim 10, further comprising maintaining the overall fuel flow after reaching the predetermined dynamic operating conditions of each of the burners of the first stage using the controller and the stage flow valve.

15. The method of claim 10, further comprising, when the predetermined dynamic operating condition for each burner is reached, increasing the respective burner fuel flow rate to provide a desired operating margin away from the predetermined dynamic operating condition using the controller, respective burner flow sensors, and at least one of the stage fuel flow valve and the respective burner flow valve.

16. The method of claim 10, further comprising performing the steps of claim 13 responsive to a change in a load on the gas turbine engine.

17. The method of claim 10, wherein the first stage comprises a pilot premix stage.

* * * * *